United States Patent Office 3,284,494
Patented Nov. 8, 1966

3,284,494
PROCESS FOR PRODUCING ALPHA HYDROXY-ISOBUTYRIC ACID
Erwin F. Schoenbrunn, Ridgefield, Conn., assignor to Escambia Chemical Corporation, Pace, Fla., a corporation of Delaware
No Drawing. Filed Oct. 16, 1964, Ser. No. 404,524
10 Claims. (Cl. 260—533)

This application is a continuation-in-part of my copending application Serial No. 46,912, filed August 2, 1960, now abandoned, which is in turn a continuation-in-part of my prior application Serial No. 836,577, filed August 28, 1959, now abandoned.

This invention relates to an improved process for producing alpha hydroxyisobutyric acid from isobutylene, including hydrocarbon gas streams containing dilute concentrations of isobutylene in the form of t-butyl esters.

It is an important object of the invention to provide an economical, non-hazardous process for producing alpha hydroxyisobutyric acid from isobutylene, including dilute gaseous streams of isobutylene.

Other objects of the invention will be apparent to those skilled in the art from reading the present specification.

As disclosed in Gardner et al. Patent No. 2,847,453 and Robertson et al. Patent No. 2,847,465, it is known that alpha olefins, such as isobutylene, may be oxidized to alpha hydroxy carboxylic acids, such as alpha hydroxyisobutyric acid, by treatment with dinitrogen tetroxide either pure or in conjunction with nitric acid, or with other oxides of nitrogen. The processes of these patents provide an economical integrated means of producing alpha hydroxyisobutyric acid which is a valuable intermediate from which methacrylic acid or its esters may be obtained by methods described in the patents.

It has been discovered in accordance with the present invention, that the oxidation of isobutylene to alpha hydroxyisobutyric acid with dinitrogen tetroxide can be carried out more advantageously if the dinitrogen tetroxide is dissolved in a substantially azeotropic mixture of acetic acid and nitric acid. Such a maximum boiling azeotropic mixture comprises approximately 66 mole percent of glacial acetic acid and 33 mole percent of nitric acid (2:1 molar ratio), although substantial variations in the molar ratios of acetic to nitric acids are permissible without impairing the advantageous results obtained. Thus, for example, molar ratios of acetic to nitric acids of between about 0.5 and 3 to 1, and preferably between about 1.5 and 3 to 1, are satisfactory. Small amounts of water, desirably less than about 15% and preferably less than 5%, may also be present without having an adverse effect. If amounts of water substantially in excess of 15% by weight are present, the rate of the oxidation may be substantially retarded.

Conducting the oxidation of the isobutylene in the presence of dinitrogen tetroxide in such mixtures of acetic and nitric acids (molar ratios of between about 0.5 and 3 to 1, respectively) provides a number of important advantages. First, high yields of alpha hydroxyisobutyric acid are obtained along with high yields of intermediates which, upon further oxidation or hydrolysis, yield alpha hydroxyisobutyric acid. Thus when isobutylene is oxidized in accordance with the process of the invention, yields of alpha hydroxyisobutyric acid in excess of 80% of theoretical can readily be obtained.

The solvent mixture of acetic and nitric acids employed in the process renders the initial reaction mixture less sensitive to detonation. Mixtures of isobutylene and dinitrogen tetroxide can be made to detonate and thus impose an explosion hazard in processes employing these two materials together. However, when employing the mixtures of nitric and acetic acids in accordance with the present invention as the reaction solvent, at concentrations of dinitrogen tetroxide which are not unduly high, the reaction mixture is not detonatable even when subjected to the action of a blasting cap.

The mixed acetic and nitric acids reaction solvent of the invention provides economy in said process and can be unusually well integrated into the process. This solvent can be prepared easily from mixtures of nitric and acetic acids by distillation in which the maximum boiling azeotrope is the bottoms product. This azeotrope is obtained substantially free of water or nearly so. Small amounts of water can be tolerated in the process, but water has the disadvantage of hydrolyzing or consuming dinitrogen tetroxide to form nitric oxide and nitric acid in accordance with the following equation:

$$3N_2O_4 + 2H_2O \rightarrow 2NO + 4HNO_3$$

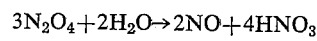

Of course, it is desirable that the solvent and the reaction system be as anhydrous as possible, desirably below about 15% water, as water consumes dinitrogen tetroxide. Any nitric oxide (NO) formed as a result of hydrolysis of dinitrogen tetroxide (as shown in the above equation) can be oxidized back to dinitrogen tetroxide by the air in accordance with the following equation:

$$2NO + O_2 \rightarrow N_2O_4$$

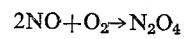

The mixed nitric and acetic acids reaction solvent of the invention provides other advantages over the use of either nitric or acetic acids alone. Nitric acid alone does not render the mixture of isobutylene and dinitrogen tetroxide less sensitive to detonation. It is also difficult to separate the by-product acetic acid formed from nitric acid. Acetic acid alone would become contaminated with by-product nitric acid. This presents difficulties in purification in any recycling of acetic acid. The azeotropic solvent comprises the liquid by-products of the reaction, nitric acid from the reaction of dinitrogen tetroxide with water which is produced from the process, and acetic acid from the oxidation of part of the isobutylene.

The preparation of the azeotrope of nitric and acetic acids is disclosed in U.S. Patent No. 2,988,425, of L. H. Sutherland et al., granted June 13, 1961.

In accordance with the present invention the isobutylene and the dinitrogen tetroxide may be brought together dissolved in a mixture of acetic and nitric acids (molar ratios of between about 0.5 and 3 to 1) in a reaction vessel at a temperature of below about 100° C. and preferably below about 80° C. At the higher temperatures the reaction proceeds more rapidly, but the yields of alpha hydroxyisobutyric acid are somewhat reduced. Where optimum yields are desired, it is preferred to operate at temperatures not in excess of about 65° C. One preferred temperature range is from about 0° C. to about 65° C.

Either the isobutylene or the dinitrogen tetroxide may be dissolved first in the mixture of acetic and nitric acids followed by passing the other into the resulting solution. In accordance with the present invention, with dilute streams of isobutylene it is desirable to introduce such streams into the mixed acids before the dinitrogen tetroxide since in reverse order the unabsorbed hydrocarbon gases may carry some dinitrogen tetroxide with them and these gaseous mixtures may provide an explosion hazard. Alternatively, and desirably, dinitrogen tetroxide may be dissolved in a first mixture of acetic and nitric acids, isobutylene may be dissolved in a second mixture of acetic and nitric acids, and the resulting solutions combined.

The concentration of dinitrogen tetroxide employed in the mixture of acetic and nitric acids may vary over a wide range; with greater yields of alpha hydroxyisobutyric acid being obtained at higher concentrations, and less sensitivity to detonation being obtained at lower concentrations. Small amounts of dinitrogen tetroxide, sufficient to promote oxidation of the isobutylene may be generated during the course of the process by the action of oxygen present in the system or introduced for the purpose. The oxygen forms dinitrogen tetroxide by reacting with nitric oxide, and perhaps other oxides of nitrogen, in accordance with the equation, supra. Of course, small amounts of dinitrogen tetroxide may be introduced to initiate the oxidation process and sufficient added supplies generated in the system by oxygen present or introduced for the purpose from reaction with the nitric oxide or other nitrogen oxide. Ample amounts of nitric oxide are usually present resulting from the decomposition of portions of the nitric acid of the solvent. The amount of dinitrogen tetroxide in the system may, therefore, be no more than a trace and there is no upper limit from the standpoint of producing yields of alpha hydroxyisobutyric acid. Larger amounts of dinitrogen tetroxide produce higher yields, but add to the expense by using larger amounts of the somewhat expensive dinitrogen tetroxide and there is an increased explosion hazard with the use of large concentrations of this material. Since the role of dinitrogen tetroxide in the process is largely catalytic, it is preferred to employ small concentrations of it and in an amount of less than one mole for each mole of isobutylene.

The oxygen which may be employed to generate dinitrogen tetroxide in the system may be introduced in the form of substantially pure oxygen gas or as air. If used in the process it is usually not necessary to employ more than two moles of oxygen for each mole of isobutylene.

The oxidation of isobutylene may be carried out at substantially atmospheric pressures, but superatmospheric pressures provide higher yields of alpha hydroxyisobutyric acid with the use of lesser amounts of dinitrogen tetroxide. Pressures of between about one and six atmospheres are highly satisfactory, although there is no maximum pressure which must not be exceeded.

After the initial oxidation of isobutylene, during which isobutylene is converted to mixtures of alpha hydroxyisobutyric acid, alpha nitratoisobutyric acid, alpha nitratoisobutyraldehyde and alpha hydroxyisobutyraldehyde, with the former predominating, the reaction products are subjected to further oxidation and hydrolysis. In the further oxidation and hydrolysis, during which the temperature may be permitted to rise to between about 0° and 150° C., the nitrato derivatives and aldehydes are converted predominantly to the alpha hydroxyisobutyric acid. The alpha hydroxyisobutyric acid may in turn be converted to other derivatives, such as methacrylic acid and esters thereof.

The time required for the process depends upon the temperature and concentrations of reactants employed and there are no limitations involved.

One of the important advantages of the mixed acetic and nitric acids reaction solvent of the invention is that it permits the use of dilute or impure streams of isobutylene in the foregoing process. It has been discovered that this reaction solvent will selectively absorb isobutylene from complex mixtures of hydrocarbon gases, containing as impurities both saturated and other unsaturated hydrocarbon gases. This was unexpected. As disclosed by Michael and Carlson, Journal of The American Chemical Society, volume 57, page 1271 (1935), it was known that nitric acid will absorb olefins, but the absorption is general, rather than selective. Thus nitric acid alone will absorb non-selectively ethylene, butene-1 and olefins in general. Consequently, it was surprising to discover that the mixtures of acetic and nitric acids would selectively absorb isobutylene from mixtures with other hydrocarbon gases, including saturated hydrocarbons as well as other olefins. This is of considerable economic importance since it permits the use of impure, vastly cheaper, sources of isobutylene without first undergoing costly refining procedures. The isobutylene is absorbed by the mixture of acetic and nitric acids and the other hydrocarbons pass from the system and may be recovered for other uses.

When the isobutylene is selectively absorbed by the mixture of acetic and nitric acids, it has been found that it is first converted to tertiary butyl nitrate and acetate and these tertiary butyl esters are then converted by the dinitrogen tetroxide to alpha hydroxyisobutyric acid and the corresponding nitrato and aldehyde intermediates thereof described hereinabove. As will be appreciated by those skilled in the art, the isobutylene may be introduced into the oxidation process in the form of the tertiary butyl esters and such form is contemplated by the invention.

The solutions of dinitrogen tetroxide or isobutylene (in the form of tertiary butyl acetate and nitrate) in the mixture of acetic and nitric acids (molar ratio of between 0.5 and 3 to 1) for use in the invention are desirably produced by passing counter current a stream of gas containing dinitrogen tetroxide or isobutylene through a column in which the mixture of acids is descending. This may be done at atmospheric pressure, but superatmospheric pressures, such as at least about 100 p.s.i.g., may be employed in the case of dinitrogen tetroxide to provide more concentrated solutions at the temperature of absorption. Unabsorbable gases, such as carbon dioxide, carbon monoxide, nitrogen, and nitrous oxide, which may be byproducts in the manufacture of dinitrogen tetroxide, or saturated and unsaturated hydrocarbons (other than isobutylene), pass out as effluent gases and are thus removed from the dinitrogen tetroxide and isbutylene and their solutions in the mixed acid solvent. This is an important advantage of the mixture of acetic and nitric acids as an absorbent for dinitrogen tetroxide, or isobutylene.

With the mixture of acetic and nitric acids, it is not necessary to desorb the dinitrogen tetroxide or isobutylene esters before using them in the oxidation process. This is another important advantage, as desorption would require expensive refrigeration to condense the dinitrogen tetroxide.

Any concentration of dinitrogen tetroxide or isobutylene esters in the mixture of acetic and nitric acids can be obtained, depending on the temperature and pressure used.

Not only is the mixture of acetic and nitric acids an excellent absorbent for concentrating and purifying dinitrogen tetroxide, but, if desired, substantially pure dinitrogen textroxide may be distilled from its solution in the mixed acids.

In order more clearly to disclosed the nature of the present invention, the following examples illustrating the invention are disclosed. It should be understood, however, that this is done solely by way of example, is intended neither to delineate the scope of the invention, nor limit the ambit of the appended claims. In the examples which follow, and throughout the specification, the quantities of materials are expressed in terms of parts by weight, unless otherwise specified.

*Example 1*

This example describes the preparation of a solution of dinitrogen tetroxide for use in the oxidation process of the invention.

Into an azeotropic mixture of 34.5 weight percent of nitric acid and 65.1 percent of acetic acid, which also contained 0.5 percent of water, maintained at 0° C., there was added dinitrogen tetroxide until a solution containing 30 weight percent of dinitrogen tetroxide was obtained. When measured at 0° C. the solution had a vapor pressure of 94.0 mm. of mercury.

Example 2

This example describes the preparation of alpha hydroxyisobutyric acid from isobutylene in accordance with the invention.

A solution was prepared by absorbing dinitrogen tetroxide in an azeotropic mixture of nitric and acetic acids at 0° C. until the solution had the following composition (weight percent): 33.0% dinitrogen tetroxide, 21.7% nitric acid, 43.6% acetic acid, and 1.7% water. To this resulting solution was added, with stirring, over a period of 55 minutes, isobutylene gas in an amount corresponding to one mole for each two moles of dinitrogen tetroxide in the reaction medium. During this interval the temperature was held at 0° C. Upon completion of the addition the reaction mixture was warmed to 60° C. and maintained at that temperature for one hour. During the interval the major portion of the remaining nitrogen oxides volatilized. Two moles of water per mole of isobutylene were then added and the mixture held at 80° C. for two hours. The resulting solution was then analyzed by elution chromatography on silica gel to give the following yields: alpha hydroxyisobutyric acid 66%, alpha nitratoisobutyric acid 10%, alpha-(alpha hydroxyisobutyroxy)-isobutyric acid 2%. Since the latter two materials are both hydrolyzable to alpha hydroxyisobutyric acid, the total yield of alph hydroxyisobutyric acid or materials readily convertible to alpha hydroxyisobutyric acid was 80%.

Example 3

This example describes the preparation of alpha hydroxyisobutyric acid.

A solution was prepared by absorbing dinitrogen tetroxide in an azeotropic mixture of nitric and acetic acids at 0° C. until the solution had the following composition (weight percent): 43.3% dinitrogen tetroxide, 19.6% nitric acid, 36.9% acetic acid, and 0.2% water. To this resulting solution was added, with stirring, over a period of thirty minutes, isobutylene gas in an amount corresponding to one mole for each 2.25 moles of dinitrogen tetroxide. During this interval the temperature was controlled at 0° C. Thereafter the reaction mixture was warmed to 60° C. and held at that temperature for one hour. During this interval the major portion of the remaining nitrogen oxides volatilized. The resulting solution was analyzed by elution chromatography on silica gel to give the following yields: alpha hydroxyisobutyric acid 24%, alpha nitratoisobutyric acid 60%. Since the latter is hydrolyzable to alph hydroxyisobutyric acid, the total yield of alpha hydroxyisobutyric acid, or materials readily convertible to it, was 85%.

Example 4

The product solution obtained in Example 2 was treated to recover alpha hydroxyisobutyric acid by evaporating 958 grams of the solution under vacuum to recover 193 grams of residue and 765 grams of distillate. The residue comprised an oil which deposited crystals when cooled to about 10° C. The mixture was filtered to recover 34% of the weight of the residue as white crystals analyzing as 94% purse alpha hydroxyisobutyric acid. The filtrate was an oil containing 35% alpha nitratoisobutyric acid, 40% alpha hydroxyisobutyric acid, 8% alpha-(alpha hydroxyisobutyroxy)-isobutyric acid, 4% acetic acid, 10% nitric acid, and 3% water. This oil could then be hydrolyzed further to convert the remaining $C_4$ and $C_8$ acids to alpha hydroxyisobutyric acid.

Example 5

This example demonstrates the resistance to detonation of the solutions of the invention.

The compositions indicated in Table I below were prepared by absorbing dinitrogen tetroxide in appropriate amounts of nitric acid-acetic acid azeotrope until the desired compositions were obtained. One mole of isobutylene was then added to the mixture, with stirring at 0° C., over a period of about one-half hour. Thereafter the solutions were stored in 250 ml. glass-stoppered Erlenmyer flasks at −78° C. and transported to an explosives testing range. A wired blasting cap was used to produce a detonating shock in each. The blasting cap was placed in a water-filled test tube to protect it from corrosive attack by the material being tested, and the test tubes in turn were immersed in the test solutions.

The solutions were warmed to −10 to 0° C. immediately before testing. The results are indicated at Table I below where 0 indicates that the solution was not detonated by the action of the blasting cap, + indicates that an explosion resulted and − indicates no test. The product obtained from isobutylene and $N_2O_4$ exploded in two attempts. When a half mole of nitric and one mole of acetic acid was used only one out of three exploded. At higher concentrations of the azeotrope no explosions resulted.

TABLE I

| Solution | Solution Composition, moles per mole isobutylene | | | | Test Results | | |
|---|---|---|---|---|---|---|---|
| | Dinitrogen Tetroxide | Nitric Acid | Acetic Acid | Water | 1 | 2 | 3 |
| A | 5.0 | 0 | 0 | 0 | + | + | − |
| B | 4.0 | 0.5 | 1.0 | 0.03 | 0 | + | 0 |
| C | 2.25 | 1.5 | 3.0 | 0.03 | 0 | 0 | 0 |
| D | 2.0 | 2.5 | 5.0 | 0.14 | 0 | 0 | 0 |
| E | 2.0 | 2.0 | 4.0 | 0.04 | 0 | 0 | 0 |

While these mixtures cannot be detonated with a blasting cap, they can be made to detonate if properly confined in steel and shocked with a charge of tetryl. In order to be inert to such a challenge, the mixture should desirably be limited to 0.5 mole of dinitrogen tetroxide per mole of isobutylene or less.

Example 6

This example illustrates the selective absorption of isobutylene from a dilute stream with a mixture of acetic and nitric acids and then producing alpha hydroxyisobutyric acid by treating the resulting solution with dinitrogen tetroxide.

A mixture of $C_4$ hydrocarbons was obtained having composition shown in Table II below. Twenty parts of the mixture was bubbled, via a sintered glass sparger, into 189 parts of an acid mixture containing 33% nitric acid, 63% acetic acid, and 4% water. The mixture was held between 0° and minus 2° C. during the addition. Nitrogen gas was then admitted through the same sparger, continuing to hold the temperature of the mixture at 0° C. The unabsorbed hydrocarbons were condensed in a trap at solid carbon dioxide temperature and found to weigh 4.0 parts. The temperature of the acid mixture was then increased to 10° C., continuing the nitrogen purging, and an additional 1.4 parts of hydrocarbons were recovered. Analysis of these two hydrocarbon fractions by vapor-phase chromatography resulted in the component balance shown in Table III below. These data show that over 99% of the isobutylene was absorbed, while the bulk of the remaining $C_4$ hydrocarbons were recovered unchanged. Inspection of the data reveals some minor inconsistencies, such as the recovery of more n-butane than was charged. These inconsistencies arise in part from the difficulty in handling these volatile materials and in part from limitations in the analytical procedure. However the overall conclusion that isobutylene is absorbed with great selectivity is believed sound.

The solution of acetic and nitric acids containing the absorbed isobutylene was then cooled to minus 30° C. after which 69 parts of dinitrogen tetroxide was added. The temperature was then increased to 20° C. for thirty minutes, followed by two hours at 60° C. The solution was then concentrated by evaporation under reduced pressure to a residue weighing 74.5 parts. This was analyzed by liquid-phase chromatography, using wet silica gel as the stationary phase and a 60:40 mixture of methyl ethyl ketone:chloroform as the eluant. The following organic acids were found (expressed in terms of milliequivalents per part of eluate):

| | |
|---|---|
| Acetic acid | 5.60 |
| Alpha-nitratoisobutyric acid plus alpha-acetoxyisobutyric acid | 1.19 |
| Alpha-(alpha-hydroxyisobutyroxy)-isobutyric acid | 0.06 |
| Alpha-hydroxyisobutyric acid | 1.48 |

Thus, the total yield of alpha hydroxyisobutyric acid, either as such or as materials readily hydrolyzed to it, was 84%, based on the isobutylene in the original sample of mixed hydrocarbons.

Tables II and III are shown below:

TABLE II.—COMPOSITION OF C₄ HYDROCARBON MIXTURE USED [EXPRESSED AS MOLE PERCENT]

| | |
|---|---|
| Isobutylene | 67.7 |
| Isobutane | 18.4 |
| Butene-1 plus Cis-butene-2 | 3.5 |
| n-Butane | 8.1 |
| Butadiene-1,3 | 0.9 |
| Trans-butene-2 | 1.4 |
| | 100.0 |

TABLE III.—COMPONENT BALANCES—ABSORPTION OF C₄ HYDROCARBONS IN NITRIC ACID-ACETIC ACID AT 0° C. (IN PARTS BY WEIGHT)

| | Iso-butylene | Trans-butene-2 | Cis-butene-2 plus Butene-1 | Buta-diene-1,3 | n-Butane | Iso-butane |
|---|---|---|---|---|---|---|
| In feed | 13.42 | 0.28 | 0.70 | 0.18 | 1.66 | 3.78 |
| Recovered at 0° C | 0.08 | 0.15 | 0.38 | 0.07 | 1.63 | 1.68 |
| Recovered at 10° C | 0.03 | 0.14 | 0.26 | 0.07 | 0.43 | 0.47 |
| Total Recovered | 0.11 | 0.19 | 0.64 | 0.14 | 2.06 | 2.15 |

*Example 7*

Example 6 was repeated, except that after the isobutylene had been absorbed in the solvent and the nitrogen purge had been performed, the product was placed into a mixture of methylene chloride and excess aqueous sodium bicarbonate. By this means, the nitric acid and acetic acid were transferred to the water layer and the isobutylene derivatives were left in the methylene chloride. Concentration of the methylene chloride layer and analysis of the isobutylene derivatives showed them to be exclusively t-butyl nitrate, t-butyl acetate and t-butyl alcohol.

*Example 8*

This example illustrates the selective absorption of isobutylene by a mixture of acetic and nitric acids.

A solution was made of 109 parts acetic acid, 11 parts water and 109 parts nitric acid and cooled to 0° C. Thereafter, it was maintained at 0° C. while 40 parts of hydrocarbon was bubbled into it. This 40 parts mixture comprised 24 parts n-butane, 11.4 parts isobutylene, 3.6 parts isobutane, 0.4 part propane, 0.2 part butene-1, 0.2 part trans-butene. The unabsorbed gas was collected in a cold trap and analyzed. It comprised 23.2 parts n-butane, 0.14 part isobutylene, 3.6 parts isobutane, 0.6 part propane, 0.2 part butene-1, and traces of trans-butene and cis butene. Thus the isobutylene was absorbed with 98% efficiency. The nitric acid-acetic acid solution of isobutylene was converted to alpha hydroxyisobutyric acid by reaction at elevated temperature in accordance with the procedure of Example 6.

*Example 9*

This example illustrates the oxidation of isobutylene using dinitrogen tetroxide formed in part by the introduction of oxygen.

In a reactor was placed an oxidizing solution which consisted of one mole of nitric acid, two moles of acetic acid and one mole of dinitrogen tetroxide. This solution was stirred at 45° C. while one mole of isobutylene in solution was added slowly. The isobutylene solution was made up of one mole of isobutylene, 1.5 moles of nitric acid, and three moles of acetic acid. (In such a solution the isobutylene is in the form of t-butyl nitrate and t-butyl acetate.) The resulting mixture was stirred for five hours at 45° C. while one mole of oxygen was bubbled into the solution. Thereafter, the mixture was heated for an additional five hours at 80° C. Analysis of this solution showed a yield of alpha hydroxyisobutyric acid which was 68.5% of the theoretical.

*Example 10*

The process of the preceding example was repeated except that the oxidizing solution consisted of one mole of nitric acid, 1.5 moles of acetic acid, 0.5 mole of water and one mole of dinitrogen tetroxide. The isobutylene solution was made from one mole of isobutylene, 2.2 moles of acetic acid, 1.5 moles of nitric acid and 0.6 mole of water. The oxidant was stirred at 65° while the isobutylene solution was added, and for five hours longer. Thereafter, it was heated for five hours at 80° C. This procedure, without any air or oxygen addition, gave a yield of alpha hydroxyisobutyric acid which was 48% of the theoretical.

*Example 11*

The example illustrates the process of the invention carried out at superatmospheric pressures.

A continuous reactor was operated at elevated pressure of between about four to five atmospheres by continuously pumping oxidant and isobutylene solution separately. The reactor was maintained at 45° C. by a cooling jacket, and air was introduced at a rate which provided 0.3 mole of oxygen per mole of isobutylene. The isobutylene solutioin was made up from 1.5 moles of nitric acid, 2.3 moles acetic acid, and 0.6 mole of water per mole of isobutylene. The oxidant comprised 2 moles of nitric acid, 3 moles of acetic acid and 0.8 mole of water per mole of isobutylene. No dinitrogen tetroxide was formed in the reactor to propagate the reaction. The overflow on the reactor was set so that the average residence time of the solution was three hours. The product which overflowed at steady state was subsequently heated for five hours at 80° C. By this method a yield of alpha hydroxyisobutyric acid of 63% of the theoretical was obtained.

As is well-known, dinitrogen tetroxide exists in an equilibrium mixture of the monomer, nitrogen dioxide ($NO_2$), and the dimer ($N_2O_4$). The equilibrium concentration of the monomer is a function of temperature, as described in "Inorganic Chemistry," F. Ephraim, 3rd English Edition (Nordman, New York) (1939), page 667. When used in this specification and the claims, the expression "dinitrogen tetroxide" is intended to include the equilibrium concentration of the monomer at the temperature employed.

The terms and expressions which have been employed are used as terms of description and not of limitation, and it is not intended, in the use of such terms and expressions, to exclude any equivalents of the features shown

What is claimed is:

1. In the process of producing alpha hydroxyisobutyric acid by oxidizing isobutylene with dinitrogen tetroxide, the improvement which consists of carrying out the oxidation of isobutylene in a reaction solvent consisting essentially of a mixture of acetic and nitric acids and no more than about 15% by weight of water, wherein the molar ratio of acetic to nitric acids in the reaction solvent is between about 0.5 and 3 to 1, wherein the initial oxidation temperature is less than 100° C.

2. The process defined by claim 1, wherein the mixture of acetic and nitric acids is a substantially azeotropic mixture comprising a ratio of about two moles of acetic acid for each mole of nitric acid.

3. The process defined by claim 1, wherein the isobutylene is employed in the form of a mixture containing other hydrocarbon gases.

4. The process as defined by claim 1, wherein at least part of the dinitrogen tetroxide is generated in the reaction mixture by the reaction of oxygen on the oxides of nitrogen present.

5. The process as defined by claim 1, wherein the process is carried out at superatmospheric pressures.

6. The process as defined by claim 1, wherein the initial oxidation temperature is less than 80° C.

7. The process as defined by claim 1, wherein the temperature is subsequently increased to between about 0° C. and 150° C.

8. The process as defined by claim 1, wherein dinitrogen tetroxide is first absorbed in said mixture of acetic and nitric acids and then a stream of substantially pure isobutylene is passed into the resulting solution.

9. The process as defined by claim 1, wherein the isobutylene is first absorbed in said mixture of acetic and nitric acids and then a stream of dinitrogen tetroxide is passed into the resulting solution.

10. The process as defined by claim 9, wherein the isobutylene is employed in the form of a mixture containing saturated hydrocarbon gases and olefinic hydrocarbon gases other than isobutylene.

References Cited by the Examiner

UNITED STATES PATENTS

| | | | |
|---|---|---|---|
| 2,314,217 | 3/1943 | Hyde et al. | 260—676 |
| 2,494,335 | 1/1958 | Dutson | 260—676 |
| 2,847,453 | 8/1958 | Gardner et al. | 260—533 |
| 2,847,465 | 8/1958 | Robertson et al. | 260—533 |
| 3,198,823 | 8/1965 | Akabayashi et al. | 260—533 X |

OTHER REFERENCES

Clingman et al.: Industrial and Engineering Chemistry, vol. 50, pages 777–780 (May 1958).

LORRAINE A. WEINBERGER, *Primary Examiner.*

I. R. PELLMAN, *Assistant Examiner.*

UNITED STATES PATENT OFFICE
CERTIFICATE OF CORRECTION

Patent No. 3,284,494                          November 8, 1966

Erwin F. Schoenbrunn

It is hereby certified that error appears in the above numbered patent requiring correction and that the said Letters Patent should read as corrected below.

Column 5, lines 26 and 49, for "alph", each occurrence, read -- alpha --; line 61, for "purse" read -- pure --; column 8, line 45, for "to" read -- and --; line 50, for "solutioin" read -- solution --; column 8, line 54, after "tetroxide" insert -- per se was added, because sufficient dinitrogen tetroxide --.

Signed and sealed this 12th day of September 1967.

(SEAL)
Attest:

ERNEST W. SWIDER                                  EDWARD J. BRENNER
Attesting Officer                                           Commissioner of Patents